(12) United States Patent
Bardin et al.

(10) Patent No.: US 10,953,698 B2
(45) Date of Patent: Mar. 23, 2021

(54) TREAD FOR HEAVY GOODS VEHICLE WINTER TIRE

(71) Applicant: COMPAGNIE GENERALE DES ETABLISSEMENTS MICHELIN, Clermont-Ferrand (FR)

(72) Inventors: Damien Bardin, Clermont-Ferrand (FR); Fabien Marlier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 377 days.

(21) Appl. No.: 15/778,890

(22) PCT Filed: Dec. 1, 2016

(86) PCT No.: PCT/FR2016/053160
§ 371 (c)(1),
(2) Date: May 24, 2018

(87) PCT Pub. No.: WO2017/093669
PCT Pub. Date: Jun. 8, 2017

(65) Prior Publication Data
US 2018/0370294 A1 Dec. 27, 2018

(30) Foreign Application Priority Data

Dec. 3, 2015 (FR) ...................................... 15/61822

(51) Int. Cl.
*B60C 11/11* (2006.01)
*B60C 11/13* (2006.01)
(Continued)

(52) U.S. Cl.
CPC ...... *B60C 11/0323* (2013.01); *B60C 11/0302* (2013.01); *B60C 11/0309* (2013.01);
(Continued)

(58) Field of Classification Search
CPC ............. B60C 11/0323; B60C 11/1369; B60C 11/0302; B60C 11/1281; B60C 11/11
See application file for complete search history.

(56) References Cited

U.S. PATENT DOCUMENTS

D275,474 S  *  9/1984  Graas ........................... D12/596
6,382,283 B1 *  5/2002  Caretta ................... B60C 11/12
                                                        152/209.18
(Continued)

FOREIGN PATENT DOCUMENTS

CA        2064405 A   * 10/1993
DE       1605638 A1     1/1970
(Continued)

OTHER PUBLICATIONS

Machine translation for Japan 2006-051863 (Year: 2020).*
Translation for Japan 2001-130227 (Year: 2020).*

*Primary Examiner* — Steven D Maki
(74) *Attorney, Agent, or Firm* — Dickinson Wright PLLC; Steven Hurles

(57) ABSTRACT

The tread comprises circumferential grooves which delimit an intermediate row (I) and edge rows (B). The tread also has a plurality of V-shaped oblique grooves with branches that make an angle of 30° to 60° with the axial direction. The circumferential and oblique grooves delimit a plurality of V-shaped blocks in each intermediate row. In each V-shaped block, there is a canal below the tread surface, and this canal has a width of 2 to 6 mm and is intended to generate a new groove after a predetermined amount of wear. When new, each canal has openings that open into the oblique grooves. A bridge of material is formed between the V-shaped blocks and occupies heightwise at least 40% of the depth of the oblique grooves and doing so over a width at least 10 mm. The bridge of material is suitable for not closing the openings of the canals.

10 Claims, 2 Drawing Sheets

(51) Int. Cl.
 *B60C 11/03* (2006.01)
 *B60C 11/12* (2006.01)

(52) U.S. Cl.
 CPC ........... *B60C 11/11* (2013.01); *B60C 11/1204* (2013.01); *B60C 11/1281* (2013.01); *B60C 11/1369* (2013.01); *B60C 11/1259* (2013.01); *B60C 2011/0358* (2013.01); *B60C 2011/0372* (2013.01); *B60C 2200/06* (2013.01)

(56) References Cited

U.S. PATENT DOCUMENTS

2008/0149237 A1* 6/2008 Cambron ............. B60C 1/0016
 152/154.2
2013/0000805 A1* 1/2013 Oodaira .................. B60C 11/11
 152/209.18
2014/0318678 A1* 10/2014 Colby ..................... B29C 33/42
 152/209.18

FOREIGN PATENT DOCUMENTS

| EP | 2546080 A1 | | 1/2013 |
|---|---|---|---|
| JP | 2001-130227 A | * | 5/2001 |
| JP | 2006-051863 A | * | 2/2006 |
| JP | 2008-260438 A | | 10/2008 |
| WO | 2015-003827 A1 | | 1/2015 |

* cited by examiner

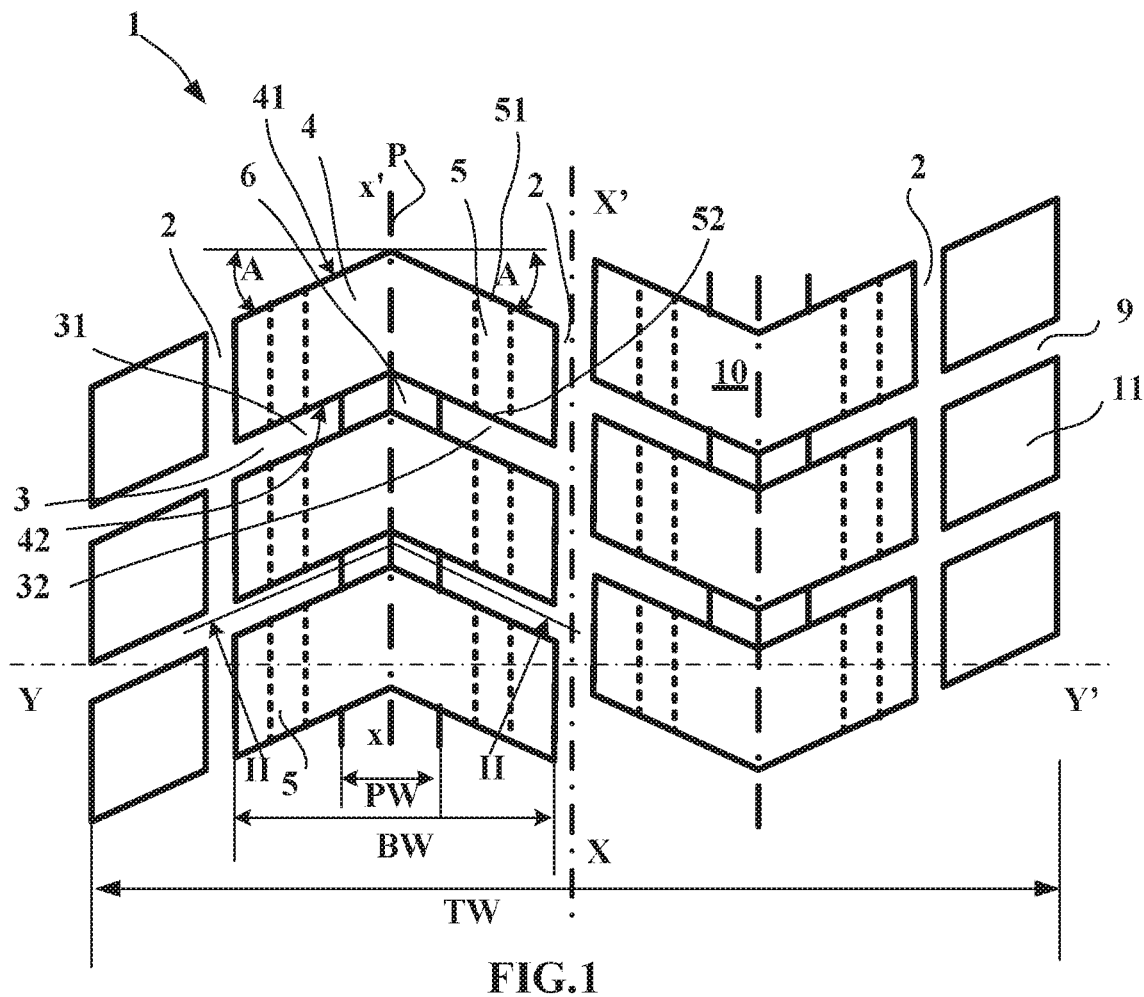
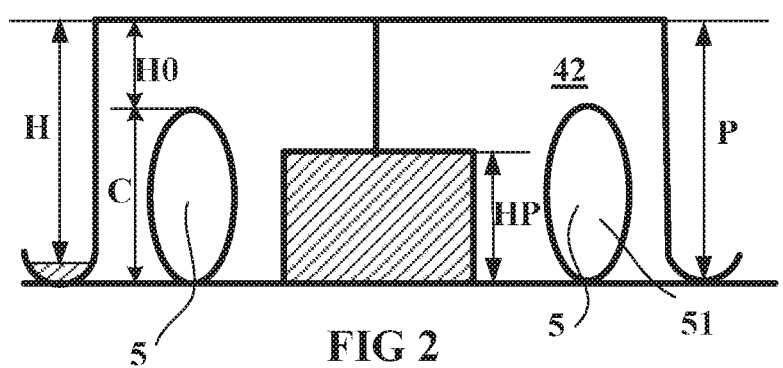

TREAD FOR HEAVY GOODS VEHICLE WINTER TIRE

CROSS-REFERENCE TO RELATED APPLICATION

The present application claims priority to PCT International Patent Application Serial No. PCT/FR2016/053160, filed Dec. 1, 2016, entitled "TREAD FOR HEAVY GOODS VEHICLE WINTER TYRE," which claims the benefit of FR Patent Application Serial No. 1561822, filed Dec. 3, 2015.

BACKGROUND OF THE INVENTION

1. Field of the Invention

The present disclosure relates to treads for tires and more particularly to the tread patterns of these treads and to the tires provided with such treads, the performance of which is improved under winter running conditions.

2. Related Art

As is known, tires for heavy goods vehicles are provided with a tread, the tread surface of which is intended to come into contact with the road surface during running.

In order to meet the conditions for running on a road surface covered with water, a suitable pattern is formed in the tread of each tire, this pattern being created by the grooves and more generally voids or cavities and cuts having depths and volumes that are suitable for ensuring lasting performance throughout the use of the tire down to its wear limit. This wear limit is determined by the regulations of the countries in which running takes place.

It has been found that, in order to ensure that the tires behave correctly on ground covered with snow, it is necessary to supplement the tread pattern with a plurality of sipes, these sipes creating a large number of edge corners that are useful for increasing grip on snow and ice with which the road surface is covered in winter, with the minimum possible effect on the rigidity of the tread.

In combination with these sipes it is necessary to arrange on the tread surface cavities which drain water away during running so as to ensure good grip on wet road surfaces.

The publication WO 2011111394 in particular discloses a tread of a tire for a heavy goods vehicle comprising a plurality of circumferential grooves and of oblique grooves. These circumferential grooves and these oblique grooves delimit several rows of blocks of material. These blocks have a geometry of a contour comprising a convex part and a concave part, these two parts being separated in the circumferential direction.

All the blocks have an arrowhead shape which may or may not be symmetrical. Furthermore, this same document foresees the presence, within each block, of a plurality of sipes parallel to the oblique grooves that delimit the blocks.

The object of the disclosure is to propose a novel tread pattern for a tire tread of a heavy goods vehicle, combining both a high level of grip on the road under wintry conditions (snow, ice) and good performance on wet roads.

Definitions

In the present document, a radial direction means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centered on the axis of rotation. This direction is perpendicular both to the axial direction and to a radial direction.

The equatorial mid-plane is a plane perpendicular to the axis of rotation and passing through the points of the tire that are radially farthest from the said axis. For a tread, this plane divides the tread widthwise into two halves of equal widths.

A rib is a raised element formed on a tread, this element extending in the circumferential direction and making a circuit of the tire. A rib comprises two lateral walls and a contact face, the latter being intended to come into contact with the road surface during running.

A cut generically denotes either a groove or a sipe and corresponds to the space delimited by walls of material that face one another and are at a non-zero distance (referred to as the "width of the cut") from one another. It is precisely this distance that distinguishes a sipe from a groove; in the case of a sipe, this distance is suitable for allowing the opposing walls that delimit the said sipe to come into at least partial contact at least when they come into contact with the road surface. In the case of a groove, the walls of this groove cannot come into contact with one another under usual running conditions.

A tread has a maximum thickness H of material to be worn away during running; once this thickness has been reached, either the tire can be regrooved in order to benefit from new grooves, or the tire is replaced with another, new, tire. The depth of the grooves is slightly greater than this thickness of wearing material, so as to maintain a minimum drainage volume.

The usual running conditions of the tire, or conditions of use, are those which are defined notably by the E.T.R.T.O. standard or any equivalent standard depending on the country in question; these use conditions specify the reference inflation pressure corresponding to the load-bearing capability of the tire as indicated by its load index and speed rating. These use conditions may also be referred to as "nominal conditions" or "working conditions".

BRIEF DESCRIPTION OF THE INVENTION

According to the present disclosure, the tread, intended to equip a tire for a heavy goods vehicle, has a thickness H of wearing material and is intended to provide rolling contact with a road surface. This tread comprises:
  at least two circumferential grooves of depth P at least equal to the thickness H
  a plurality of V-shaped oblique grooves, each oblique groove comprising branches making an angle at least equal to 30° and at most equal to 60° with the axial direction, these grooves having a width at least equal to 5 mm and at most equal to 12 mm and a depth at least equal to the thickness H,
  the circumferential grooves and the oblique grooves delimiting a plurality of V-shaped blocks in each intermediate row, that is to say such that each block comprises a convex part and a concave part.

A plane P divides each V-shaped block into two parts and is defined as being perpendicular to the axis of rotation of the tire and passing through the forward-most points of the convex part of each block.

This tread has:
  in each V-shaped block, and on either side of the plane P that divides each block into two parts, there is formed at least one canal below the tread surface, this canal having a width at least equal to 2 mm and at most equal to 6 mm and being intended to generate a new groove after a predetermined amount of partial wear, each canal when new comprising openings that open into the oblique grooves, and in that a bridge of material is formed between the V-shaped blocks considered in twos, this bridge of material connecting a convex part of one block to the concave part of an adjacent block in the same row, this bridge of material occupying heightwise and from the bottom of the oblique grooves at least 40% of the depth of the oblique grooves and doing so over a width at least equal to 10 mm, this bridge of material being suitable for not closing the openings of the canals.

By virtue of this tread pattern, a tread maintains substantially the same level of grip on a snow-covered road surface over at least 75% of the wearing life of the tread while at the same time maintaining, with wear, a good level of grip on road surfaces covered with standing water in rainy weather. This tread also maintains good performance in terms of wear and in terms of rolling resistance.

The canal formed below the tread surface may be straight or have a zigzag geometry. For preference, each canal is suitable for forming new grooves on the tread surface after wear representing between 20% and 50% wear.

In an alternative form of embodiment of the disclosure, at least one canal formed below the tread surface of a block is extended towards the tread surface when new by a sipe the width of which is suited to at least partially closing up on itself as it comes into contact with the road surface.

In one particular alternative form of embodiment, the tread according to the disclosure comprises two rows of V-shaped blocks, these two rows being positioned in a central region, this central region being situated on each side of the equatorial mid-plane, the two circumferential grooves delimiting this central region being spaced apart by a distance at most equal to 70% of the total width of the tread.

In another advantageous alternative form of embodiment, the tread is such that the oblique grooves formed on the intermediate parts are oriented so as to create a directional tread pattern, that is to say one having an optimal running direction.

In another advantageous alternative form of embodiment, each V-shaped block is symmetrical with respect to the plane P.

Advantageously, each canal is designed to form a new groove at between 20% and 50% wear (namely at between 20% and 50% of the wearing thickness H). In an associated alternative form of embodiment, each new groove has a bottom situated at most at 75% of the thickness H and is then extended by a sipe. For preference, this sipe is extended beyond the wear limit at which the tire has to be removed.

In an alternative form of embodiment of the disclosure, each block further comprises at least one V-shaped oblique sipe in the arrowhead-shaped blocks, this at least one V-shaped oblique sipe being arranged in such a way as to run parallel to the oblique grooves. The depth of these V-shaped oblique sipes being at least equal to 50% of the thickness H of wearing material.

According to another alternative form of embodiment of the disclosure, the tread comprises a groove centered on the equatorial mid-plane and at least two rows of arrowhead-shaped blocks on either side of this equatorial mid-plane, the blocks of one row being oriented in one direction while their neighbours are oriented in the opposite direction.

The bridging between the blocks of the one same row is dimensionally suited to leaving the openings of the canals in the oblique grooves open. Advantageously, the height of the bridgings measured with respect to the bottom of the oblique grooves is suitable for these bridgings to extend least over the entire depth of the canals.

The edges of the tread, which means to say the axially outermost parts of the tread, may be continuous or grooved. For preference, they do not have V-shaped blocks.

Further features and advantages of the disclosure will become apparent from the following description with reference to the appended drawings which show, by way of non-limiting examples, embodiments of the subject matter of the disclosure.

BRIEF DESCRIPTION OF THE FIGURES

FIG. 1 shows a view of a non-directional first alternative form of embodiment of a tread according to the disclosure;

FIG. 2 shows a cross section in a plane of which the line in FIG. 1 is indicated by the line II-II.

DESCRIPTION OF THE ENABLING EMBODIMENTS

Figure 3:
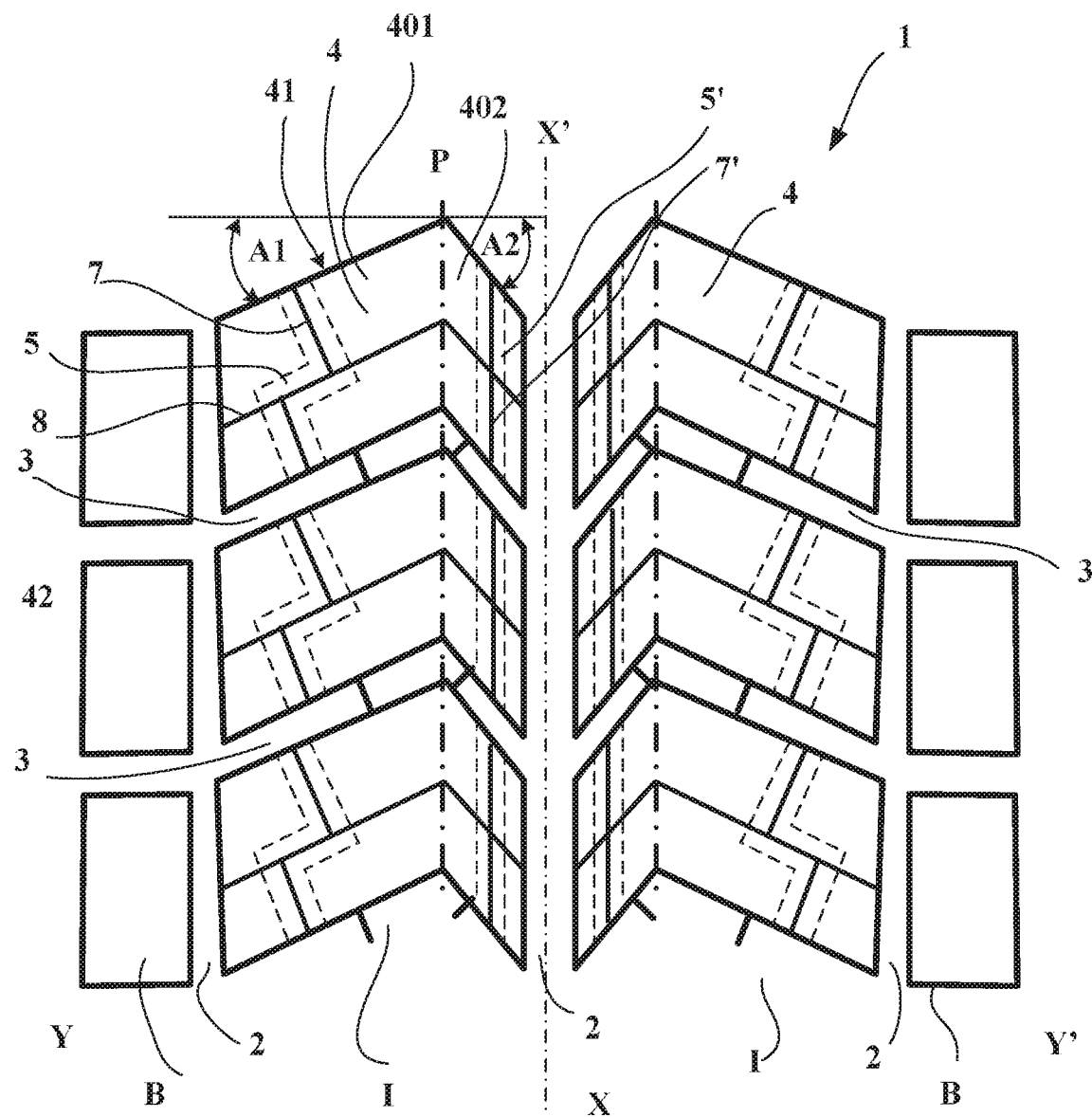
FIG. 3 shows a directional second alternative form of embodiment of a tread according to the disclosure.

To make the figures easier to understand, identical reference signs have been used to denote alternative forms of the disclosure where these reference signs refer to elements of the same kind, whether structurally or functionally.

FIG. 1 shows a view of a non-directional first alternative form of embodiment of a tread according to the disclosure.

In this alternative form, the tread 1 of a tire for a heavy goods vehicle of size 365/6 5 R 22.5 comprises three main circumferential grooves 2 of width 13.5 mm and of total depth P equal to 14.6 mm. This tread 1 has a width TW equal to 306 mm and a thickness H of wearing material equal to 13 mm (this thickness is less than the total depth P of the grooves so as to maintain a suitable drainage volume all the way down to the wear limit).

These main grooves 2, one of which is centered on the equatorial mid-plane the line of which is indicated by the line XX', divide the tread into two intermediate rows I and two edge rows B, the latter axially bounding the tread.

In each intermediate row I, oblique transverse grooves 3 are produced in a V-shape so as to delimit, with the circumferential main grooves 2, a plurality of arrowhead-shaped, which is to say V-shaped, blocks 4. Each block 4 comprises a convex face 41 and a concave face 42, these two faces being separated from one another in the circumferential direction (which is to say in the direction XX').

The oblique transverse grooves 3 have a width equal to 8 mm and a total depth equal to the depth P of the main grooves. Each of the V-shaped oblique transverse grooves 3 comprises two branches 31, 32 each one inclined by an angle of 45 degrees with respect to the axial direction and having the same length. Each block 4 is symmetrical with respect to a plane P perpendicular to the axis of rotation of the tire (the direction of which is indicated by the line YY') and passing through the forwardmost points of the convex part 41 of each block 4, this plane P in this instance dividing the block into two equal parts.

The width BW of each block 4, measured in the axial direction, is equal to 85 mm. This tread is such that, in each V-shaped block 4 and in each part separated by the plane P, at least one canal 5 is formed under the tread surface 10 when new, this canal 5 having a width equal to 4.5 mm and being intended to generate a new groove after predetermined partial wear, in this instance equal to 25% wear (namely 25% of the height H of wearing material). Each canal 5 comprises openings 51, 52 opening into the oblique grooves 3. In this instance, the orientation of the canals 5 is parallel to the equatorial mid-plane XX'. Of course, the canals 5 could have been constructed in such a way as to be oriented perpendicular to the faces of the blocks 4.

Furthermore, a bridge of material 6 is formed between pairs of V-shaped blocks 4, this bridge of material 6 connecting a convex part 41 of one block 4 to the concave part 42 of an adjacent block in the same row I.

The blocks 4 of the intermediate other row I are arranged in such a way that the tread pattern design is not directional and therefore does not impose a preferred direction of rotation.

The edges B of the tread are provided with a plurality of axial grooves 9 delimiting blocks 11 of rectangular geometry.

FIG. 2 shows a cross section on a two-plane surface, the line of which is indicated in FIG. 1 by the broken line II-II. This FIG. 2 shows part of the concave face 42 of one V-shaped block 4 connected by a bridge of material 6 to the adjacent block. This bridge of material 6 occupies a height HP measured from the bottom of the oblique grooves 3 equal to 6.2 mm, this being over a width PW measured in the axial direction equal to 18 mm. This bridge of material 6 extends between the openings 51 of the canals 5. The bottom of the canals 5 is suitable for the new grooves formed by these canals to still be present when the wear limit is reached. The canals 5 form new grooves after an amount of wear HO, in this instance equal to 3.25 mm.

FIG. 3 shows a directional second alternative form of embodiment of a tread 1 according to the disclosure. What is meant by a directional alternative form of embodiment is that the design of the tread pattern of the tread, because of its geometry, may impose a preferred direction of running. This directional alternative form of embodiment comprises three circumferential main grooves 2 delimiting two intermediate rows I and edge regions B.

In each intermediate row I, oblique transverse grooves 3 are produced in a V-shape so as to delimit, with the circumferential main grooves 2, a plurality of arrowhead-shaped, which is to say V-shaped, blocks 4. Each block 4 comprises a first branch 401 and a second branch 402; the axially innermost branch 401 is inclined at a mean angle A1 (in this instance equal to 30°) while the branch 402 is inclined by a mean angle A2 (in this instance equal to) 45°.

Each block 4 comprises a convex face 41 and a concave face 42, these two faces being separated from one another in the circumferential direction (which is to say in the direction indicated by the line XX').

The oblique transverse grooves 3 have a width equal to 8 mm and a total depth equal to the depth P of the main grooves. Each block 4 is asymmetric with respect to a plane P passing through the forwardmost points of the convex part of each block 4 (this plane is indicated by its line xx' in the plane of FIG. 3, this plane being perpendicular to the axis of rotation of the tire, the direction of which is indicated by the line YY'). This plane P divides the block 4 into two unequal parts.

The width BW of each block 4, measured in the axial direction, is equal to 85 mm. This tread is such that, in each V-shaped block 4 there is formed, in the axially outer part of the block with respect to the plane P, a first canal 5 under the tread surface 10 when new, this canal 5 having a width equal to 4.5 mm and being intended to generate a new groove after predetermined partial wear, in this instance equal to 25% wear. On the other hand, there is also formed, in the other part of the block 4, a second canal 5' of the same dimensions as the canal 5. In this instance, the canal 5 formed in the axially widest part of the block has a zigzag geometry and comprises two openings into the oblique transverse grooves. In the other part, the canal 5' is oriented chiefly in the circumferential direction.

Furthermore, each canal 5, 5' is extended radially towards the tread surface when new by a respective sipe 7, 7', each sipe having a width suitable for being able to close up on itself at least partially when it comes into contact with the road surface during running.

In addition, each block 4 comprises a sipe 8 having the same orientation as the oblique transverse grooves 3, this sipe 8 being situated equidistant from the convex and concave faces of the block 4. This sipe 8 has a width also suitable for closing up on itself at least partially when it comes into contact with the road surface during running. This sipe 8 in this instance comprises a part in common with the sipe 7 radially surmounting a canal.

In an alternative form of embodiment not depicted here, the sipe 8 may itself be extended by a canal under the tread surface, this canal being intended to form a new groove after predetermined partial wear (which may or may not be identical to the partial wear beyond which the canals 5 form new grooves).

Furthermore, a bridge of material 6 is formed between pairs of V-shaped blocks 4 in the one same intermediate row, this bridge of material 6 connecting a convex part of one block to the concave part of an adjacent block in the same row and being suitable in terms of dimensions for leaving the openings of the canals 5 and 5' open.

The blocks 4 of the intermediate rows I are arranged with the same orientation so that the tread pattern design is directional and therefore can impose a preferred direction of rotation indicated for example by an indicator on the edges of the tread (arrow F in FIG. 3).

The edges B of the tread are provided with a plurality of axial grooves 9 delimiting blocks 11 of rectangular geometry.

The disclosure which has been described here with the aid of two alternative forms of embodiment is of course not limited to these alternative forms of embodiment alone, and various modifications can be made thereto without departing from the scope as defined by the claims.

The invention claimed is:

1. A heavy goods vehicle tire having a tread, this tread having a thickness H of wearing material and intended to provide rolling contact with a road surface, this tread comprising:
   at least two circumferential grooves of depth P at least equal to the thickness H, these circumferential grooves delimiting at least one intermediate row and two edge rows axially delimiting the tread,
   a plurality of V-shaped oblique grooves, each oblique groove comprising branches making an angle at least equal to 30° and at most equal to 60° with the axial direction, these oblique grooves having a width at least equal to 5 mm and at most equal to 12 mm and a depth at least equal to the thickness H,
   the circumferential grooves and the oblique grooves delimiting a plurality of V-shaped blocks in each intermediate row, that is to say such that each block comprises a convex part and a concave part, a plane P dividing each V-shaped block into two parts and being defined as being perpendicular to the axis of rotation of the tyre and passing through the forwardmost points of the convex part of each block, wherein in each V-shaped block, and on either side of the plane P that divides each block into two parts, there is formed at least one canal below the tread surface, this canal having a width at least equal to 2 mm and at most equal to 6 mm and being intended to generate a new groove after a predetermined amount of partial wear, each canal when new comprising openings that open into the oblique grooves, and wherein a bridge of material is formed between the V-shaped blocks considered in twos, this bridge of material connecting a convex part of one block to the concave part of an adjacent block in the same intermediate row, this bridge of material occupying heightwise and from the bottom of the oblique grooves at least 40% of the depth of the oblique grooves and doing so over a width at least equal to 10 mm, this bridge of material being suitable for not closing the openings of the canals.

2. The heavy goods vehicle tire according to claim 1, wherein each canal is intended to form a new groove after wear representing between 20% and 50% of the height H of wearing material.

3. The heavy goods vehicle tire according to claim 1, wherein each canal formed below the tread surface of a V-shaped block is extended towards the tread surface when new by a sipe the width of which is suited to at least partially closing up on itself as it comes into contact with the road surface.

4. The heavy goods vehicle tire according to claim 1, wherein each V-shaped block is symmetrical with respect to the plane P.

5. The heavy goods vehicle tire according to claim 1, wherein the at least one intermediate row of V-shaped blocks is two intermediate rows of V-shaped blocks, these two rows being positioned in a central region, this central region being situated on each side of the equatorial mid-plane, the two circumferential grooves delimiting this central region being spaced apart by a distance at most equal to 70% of the total width TW of the tread.

6. The heavy goods vehicle tire according to claim 1, wherein each canal has a bottom situated at most at 75% of the thickness H and is then extended inwards by a sipe.

7. The heavy goods vehicle tire according to claim 1, wherein each block comprises at least one V-shaped oblique sipe in the V-shaped blocks, this at least one V-shaped oblique sipe being arranged in such a way as to run parallel to the oblique grooves, the depth of these V-shaped oblique sipes being at least equal to 50% of the thickness H of wearing material.

8. The heavy goods vehicle tire according to claim 1, wherein a groove is centered on the equatorial mid-plane and at least two intermediate rows of V-shaped blocks are arranged on either side of this equatorial mid-plane, the blocks of one row being oriented in one direction while the blocks of the neighbouring row are oriented in the opposite direction.

9. The heavy goods vehicle tire according to claim 1, wherein the oblique grooves formed on the intermediate parts are oriented so as to create a directional tread pattern, namely one that has an optimal direction of running.

10. The heavy goods vehicle tire according to claim 1, wherein the edges (B) of the tread, namely the axially outermost parts of the tread, do not have V-shaped blocks.

* * * * *